३,३५६,७५५
SEPARATION PROCESS
Rodney D. Beckham, Bridgeton, Mo., and Charles H. Middlebrooks, Dickinson, Tex., assignors to Monsanto Company, St. Louis, Mo., a corporation of Delaware
No Drawing. Filed Sept. 26, 1966, Ser. No. 581,742
10 Claims. (Cl. 260—677)

ABSTRACT OF THE DISCLOSURE

A process for the separation of mixtures of alkyl halides with unsaturated aliphatic hydrocarbons by contacting the mixture with an alkyl sulfoxide solvent. An extract and a raffinate phase forms with the alkyl halides being removed from the extract phase.

---

The present application is a continuation-in-part of application Serial Number 247,276, filed Dec. 26, 1962, now U.S. Patent No. 3,198,519.

The present invention relates to the separation of organic compounds by liquid-liquid solvent extraction. More particularly, the present invention relates to a process for the separation of alkylhalides from hydrocarbons by liquid-liquid solvent extraction and to the solvents useful in this process.

It is an object of the present invention to provide a liquid-liquid solvent extraction process for the separation of organic compounds. Another object of the present invention is to provide a liquid-liquid solvent extraction process for the separation of alkylhalides from hydrocarbons. A further object of the present invention is to provide a solvent for separation of alkylhalides from hydrocarbons by liquid-liquid solvent extraction. A particular object of the present invention is to provide a liquid-liquid solvent extraction process for the separation of alkylhalides from unsaturated aliphatic hydrocarbons. Additional objects of the present invention will become apparent from the following description of the invention herein disclosed.

In fulfillment of these and other objects, it has now been found that alkylhalides may be effectively separated from unsaturated aliphatic hydrocarbons by intimately mixing mixtures of such alkylhalides and said hydrocarbons with alkyl sulfoxides, allowing an extract phase and a raffinate phase to form and then separating the extract and raffinate phases. The alkylhalides are recovered from the extract phase. In a preferred mode of practice, the present process is practiced using an auxiliary solvent in conjunction with the primary solvent.

To further describe and to illustrate the present invention, the following examples are presented. These examples are in no manner to be construed as limiting to the present invention.

Example I

A feed mixture comprised of 2-bromopropane and 4-methyl-1-pentene in volume ratio of 1:4 was thoroughly agitated in a separatory funnel with dimethyl sulfoxide in a volume ratio of the mixture to dimethyl sulfoxide of 1.25:1. Temperature during agitation was 20–25° C. The solvent-feed mixture was allowed to separate into an extract and raffinate phase which were separated. The raffinate was found to contain 86% by volume of 4-methyl-1-pentene and 14% by volume of 2-bromopropane.

Example II

Example I was repeated with the exception that the solvent consisted of 94% by volume dimethyl sulfoxide and 6% by volume water. The resulting raffinate was found to contain 83% by volume 4-methyl-1-pentene and 17% by volume 2-bromopropane.

Example III

Example I is repeated with the exception that the solvent consists of diethyl sulfoxide. The resulting raffinate is found to contain a substantially higher concentration of 4-methyl-1-pentene than did the feed mixture.

Example IV

Example I is repeated with the exception that the solvent consists of dihexyl sulfoxide. The resulting raffinate is found to contain a substantially higher concentration of 4-methyl-1-pentene than did the feed mixture.

Example V

Example I is repeated with the exception that the solvent consists of methyl ethyl sulfoxide. The resulting raffinate is found to contain a substantially higher concentration of 4-methyl-1-pentene than did the feed mixture.

Example VI

A feed mixture comprised of 3-bromohexane and 1-nonene in a volume ratio of 1:4 is thoroughly agitated in a separatory funnel with dimethyl sulfoxide in a volume ratio of feed to solvent of 1.25:1. Temperature during agitation is maintained at a temperature of 20–25° C. The solvent-feed mixture is allowed to separate into an extract and a raffinate phase which are separated. The raffinate phase is found to contain a substantially higher concentration of 1-nonene than does the original mixture.

Example VII

Example VI is repeated with the exception that the solvent is comprised of 95% by volume diethyl sulfoxide and 5% by volume of ethylene glycol. The resulting raffinate phase is found to contain a substantially higher concentration of 1-nonene than does the feed mixture.

The solvents within the scope of the present invention are alkylsulfoxides. These compounds have the formula

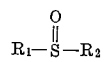

wherein $R_1$ and $R_2$ are alkyl radicals each having 1 to 12 carbon atoms. The alkyl radicals may be straight or branched-chain, but are preferably straight-chain. Non-limiting examples are the following:

| Column I | Column II |
|---|---|
| Dimethyl sulfoxide | Ethyl n-octyl sulfoxide |
| n-butyl n-propyl sulfoxide | Diethyl sulfoxide |
| Dipropyl sulfoxide | Methyl n-nonyl sulfoxide |
| di-n-butyl sulfoxide | n-butyl n-heptyl sulfoxide |
| n-butyl n-hexyl sulfoxide | n-amyl n-hexyl sulfoxide |
| n-amyl n-propyl sulfoxide | di-nonyl sulfoxide |
| Diamyl sulfoxide | n-decyl methyl sulfoxide |
| n-propyl n-hexyl sulfoxide | Didecyl sulfoxide |
| dioctyl sulfoxide | Dihexyl sulfoxide |
| Methyl n-octyl sulfoxide | n-heptyl n-amyl sulfoxide |
| Diheptyl sulfoxide | n-decyl ethyl sulfoxide |

The preferred alkyl sulfoxides are those in which $R_1$ and $R_2$ in the above formula are normal alkyl radicals of 1 to 4 carbon atoms. These compounds include dimethyl sulfoxide, diethyl sulfoxide, dipropyl sulfoxide, and dibutyl sulfoxide, methyl ethyl sulfoxide, methyl propyl sulfoxide, ethyl propyl sulfoxide, methyl butyl sulfoxide, ethyl butyl sulfoxide and the like.

The solvents of the present invention may be used singly or in combination, one with another. Also, they may be used in conjunction with a great number of auxiliary solvents such as co-solvents, modifying solvents or antisolvents. The auxiliary solvents preferred are water, the glycols including ethylene glycol, propylene glycol, triethylene glycol and the like with ethylene glycol being the preferred glycol. When auxiliary solvents are used in conjunction with the primary solvents of the present invention, they are used in an amount ranging from 1 to 75% by weight of the total solvent mixture. Preferably, the amount of auxiliary solvent will be from 3 to 30 percent by weight of the total solvent mixture.

Though the present solvents may be used for separating many organic mixtures, they are particularly useful for separating difficultly separable mixtures comprised of alkyl halides and unsaturated aliphatic hydrocarbons. The present invention finds its greatest utility in separating mixtures comprised of alkyl halides having 2 to 10 carbon atoms, particularly alkyl bromides and alkyl chlorides, and unsaturated aliphatic hydrocarbons which mixtures are difficultly separable by distillation. By difficultly separable by distillation is meant that on distillation of the mixture containing the alkyl halides the unsaturated aliphatic hydrocarbons do not separate therefrom to a practical extent. The alkyl group of the alkyl halides may be either a straight chain or a branched chain alkyl group. A particularly preferred utility for the present invention is in the separation of mixtures of alkyl mono-halides, particularly alkyl mono-bromides, having 2 to 10 carbon atoms and mono-olefin hydrocarbons which mixtures are difficultly separable by distillation.

In practicing the present invention, temperature and pressure are not of critical importance but are maintained in such relationship as to maintain the solvent and feed in the liquid phase. Temperatures within the range of 0 to 200° C. and pressures ranging from subatmospheric up to 200 p.s.i.g. are most often used. It is preferred that the temperatures at which the separation is to be carried out be approximately room temperature or somewhat more broadly within the range of 15 to 40° C. Preferably, the pressure will be at or near atmospheric pressure or within the range of from atmospheric to 10 to 15 p.s.i.g.

The ratio of solvent to feed mixture may range from 0.25 to 50 volumes of solvent per liquid volume of feed mixture. Usually, the amount of solvent will be within the range of from 0.5 to 10 volumes of solvent per liquid volume of feed mixture. The preferred amount of solvent used will be within the range of from 1 to 5 volumes of solvent per liquid volume of feed mixture. It is, of course, understood that optimum solvent mixture ratios will vary according to the amount of alkyl halides in the feed mixture and with the efficiency of the solvent-feed contact. However, the optimum ratio will be within the above ranges and may readily be determined by those skilled in the art.

The manner in which the solvents disclosed herein and the feed mixture to be separated are contacted may be by any of the conventional methods. The primary concern is that the best and most intimate liquid-liquid contact between solvent and feed mixture be obtained. This may be obtained by such conventional methods as counter-current or co-current flow of solvent and feed mixture or by batch agitation or other similar methods.

As indicated previously, the alkyl halides are absorbed by the solvents of the present invention and are thus to be found in the extract phase. The alkyl halides may be recovered from the extract phase by distillation with relative ease. However, the method of recovery of the alkyl halides from the extract is not material to the present invention and any method which presents itself to those skilled in the art may be used.

What is claimed is:

1. A process for separating alkyl halides from unsaturated aliphatic hydrocarbons which comprises contacting in liquid phase a mixture of alkyl halides of 2 to 10 carbon atoms and unsaturated aliphatic hydrocarbons with an alkyl sulfoxide solvent, forming an extract and raffinate phase and thereafter separating said extract and raffinate phases, said alkyl halides being alkyl chlorides or alkyl bromides.

2. The process of claim 1 wherein the solvent and feed mixtures are contacted in a solvent to feed volume ratio of 0.25 to 50.

3. The process of claim 1 wherein the temperature of contact is 0 to 200° C.

4. The process of claim 1 wherein the alkyl sulfoxide is one wherein the alkyl radicals are straight-chain alkyl radicals.

5. The process of claim 1 wherein the alkyl sulfoxide solvent is used in conjunction with 1 to 75% by volume as an auxiliary solvent.

6. The process of claim 5 wherein the auxiliary solvent is selected from the group consisting of water and glycols.

7. The process of claim 1 wherein said alkyl halides are alkyl mono-halides and said hydrocarbons are mono-olefin hydrocarbons.

8. The process of claim 7 wherein said alkyl halides are alkyl mono-bromides.

9. The process of claim 1 wherein the alkyl sulfoxide solvent is one in which the alkyl radicals are straight-chain and contain 1 to 4 carbon atoms.

10. The process of claim 1 wherein the solvent is dimethyl sulfoxide.

References Cited

UNITED STATES PATENTS 2,357,028  8/1944  Shiros et al. _____ 202—67
3,050,573  8/1962  Anderson et al. ____ 260—681.5

DELBERT E. GANTZ, *Primary Examiner.*

J. D. MYERS, *Assistant Examiner.*